US012609644B2

(12) United States Patent
Heikkilä et al.

(10) Patent No.: US 12,609,644 B2
(45) Date of Patent: Apr. 21, 2026

(54) ROTOR-TO-STATOR REDUCTION FACTOR EVALUATION FOR EXTERNALLY-EXCITED SYNCHRONOUS MACHINES

(71) Applicant: ABB Schweiz AG, Baden (CH)

(72) Inventors: Joni Heikkilä, Helsinki (FI); Sina Kuunsäde, Helsinki (FI); Mikko Kostiainen, Helsinki (FI)

(73) Assignee: ABB Schweiz AG, Baden (CH)

( * ) Notice: Subject to any disclaimer, the term of this patent is extended or adjusted under 35 U.S.C. 154(b) by 189 days.

(21) Appl. No.: 18/405,105

(22) Filed: Jan. 5, 2024

(65) Prior Publication Data

US 2024/0243680 A1 Jul. 18, 2024

(30) Foreign Application Priority Data

Jan. 13, 2023 (EP) ..................................... 23151482

(51) Int. Cl.
*H02P 1/02* (2006.01)
*H02P 21/14* (2016.01)
(Continued)

(52) U.S. Cl.
CPC .............. *H02P 27/05* (2013.01); *H02P 23/14* (2013.01); *H02P 2207/05* (2013.01)

(58) Field of Classification Search
CPC .. H02P 21/14; H02P 27/05; H02P 1/02; H02P 23/14; H02P 21/0025; H02P 25/022; H02P 2207/05
(Continued)

(56) References Cited

U.S. PATENT DOCUMENTS 9,490,733 B2 * 11/2016 Wu ............................. H02P 1/52
11,264,935 B2 * 3/2022 Combes .................. H02P 23/12
(Continued)

OTHER PUBLICATIONS

Winzer Patrick et al; "Dynamic control of generalized electrically excited synchronous machines using predictive flux control"; IECON 2016—42nd Annual Conference of The IEEE Industrial Electronics Society, IEEE, Oct. 23, 2016, 6 Pages.
(Continued)

*Primary Examiner* — Gabriel Agared
(74) *Attorney, Agent, or Firm* — Whitmyer IP Group LLC

(57) ABSTRACT

An apparatus for a drive for an externally excited synchronous machine. The apparatus sets a value for a stator flux linkage reference so as to enable operation in a linear region of a d-axis magnetizing inductance without saturation. The apparatus causes the drive to drive the externally excited synchronous machine with a speed within a linear modulation range using said value. During the driving, the apparatus adjusts a rotor excitation current reference to determine a minimum-load value of a rotor excitation current and causes increasing or decreasing of the rotor excitation current until a stator current is within a pre-defined range. Then, the apparatus determines operating values for the stator and rotor excitation currents and calculates a rotor-to-stator reduction factor based on the minimum-load and operating values of the rotor excitation current, the operating value of the stator current and the value for the stator flux linkage reference.

15 Claims, 2 Drawing Sheets

(51) Int. Cl.
  *H02P 23/14*       (2006.01)
  *H02P 27/05*       (2006.01)
(58) Field of Classification Search
  USPC ......................................................... 318/778
  See application file for complete search history.

(56)           References Cited

U.S. PATENT DOCUMENTS

| | | | | | |
|---|---|---|---|---|---|
| 2003/0062870 | A1* | 4/2003 | Royak | ..................... | H02P 6/185 |
| | | | | | 318/727 |
| 2004/0257028 | A1* | 12/2004 | Schulz | ..................... | H02P 21/28 |
| | | | | | 318/268 |
| 2005/0073279 | A1* | 4/2005 | Fenley | ..................... | H02P 6/15 |
| | | | | | 318/717 |
| 2008/0001570 | A1* | 1/2008 | Gaetani | ................. | H02P 25/024 |
| | | | | | 318/721 |
| 2008/0180048 | A1* | 7/2008 | Mullin | ..................... | H02P 6/08 |
| | | | | | 318/400.26 |
| 2013/0106333 | A1* | 5/2013 | Durkee | ................... | H02P 6/185 |
| | | | | | 318/400.33 |
| 2019/0140499 | A1* | 5/2019 | Takahashi | .............. | H02K 21/16 |
| 2019/0199255 | A1* | 6/2019 | Hu | ............................ | H02J 3/18 |
| 2020/0228030 | A1* | 7/2020 | Bourse | ............... | H02M 7/5387 |
| 2022/0376640 | A1* | 11/2022 | Tseng | ..................... | H02P 21/16 |

OTHER PUBLICATIONS

European Search Report; Application No. EP 23151482; Completed: Jun. 6, 2023; 2 Pages.
Kaukonen J. et al; "Salient Pole Synchronous Motor Parameter Estimation in a Direct Flux Linkage Controlled Drive", Proceedings of 7th European Conference on Power Electronics and Applications; Sep. 8-10, 1997; Trondheim, Norway; EPE European Conference on Power Electronics and Applications, Brussels; vol. 1, Sep. 8, 1997, 6 Pages.

\* cited by examiner

114: Power supply

101: Drive

102: Rectifier unit

103: Inverter unit

104: Excitation unit

111: Synchronous motor

112: Exciter

113: Load

121: Computing device

122: Memory

123: Processor

125: Software

126: Database

124: Interfaces

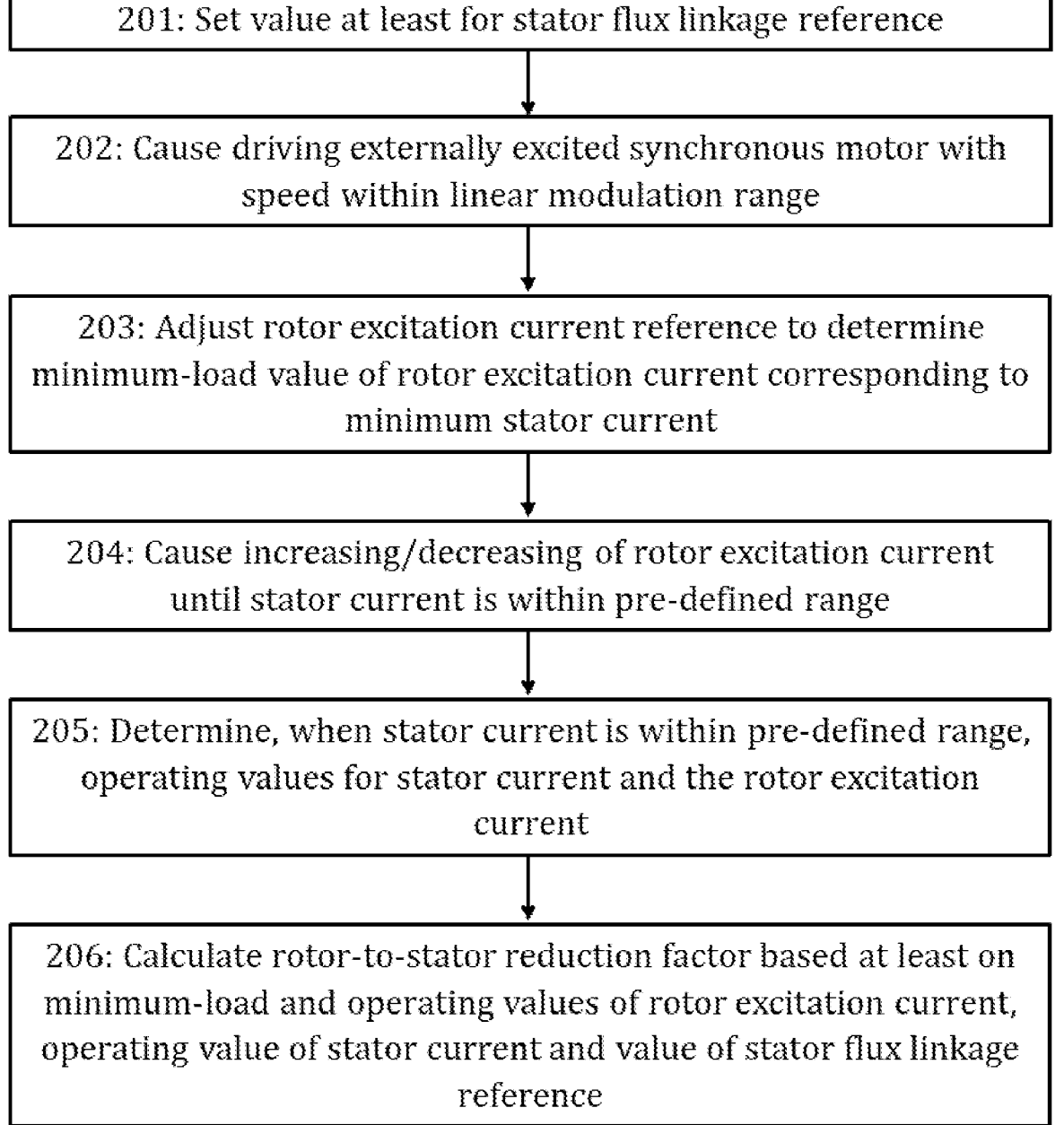

201: Set value at least for stator flux linkage reference

202: Cause driving externally excited synchronous motor with speed within linear modulation range 203: Adjust rotor excitation current reference to determine minimum-load value of rotor excitation current corresponding to minimum stator current 204: Cause increasing/decreasing of rotor excitation current until stator current is within pre-defined range 205: Determine, when stator current is within pre-defined range, operating values for stator current and the rotor excitation current 206: Calculate rotor-to-stator reduction factor based at least on minimum-load and operating values of rotor excitation current, operating value of stator current and value of stator flux linkage reference

Fig. 2

ROTOR-TO-STATOR REDUCTION FACTOR EVALUATION FOR EXTERNALLY-EXCITED SYNCHRONOUS MACHINES

TECHNICAL FIELD

Various example embodiments relate to control of industrial processes.

BACKGROUND

In the externally excited synchronous machines, the reduction factor (or more specifically the rotor-to-stator reduction factor) is used to refer the rotor excitation current to the stator side. The reduction factor is equal for both salient and non-salient pole synchronous machines.

Conventionally, the reduction factor is calculated from short circuit measurements (i.e., from a short-circuit curve) and from zero-load measurements. This calculation typically requires specific data provided by the manufacturer of the synchronous machine. However, this data may not be always available and/or it may be inaccurate leading to an error in the calculated reduction factor.

SUMMARY

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

Some embodiments provide an apparatus, a method, and computer program for calculating a rotor-to-stator reduction factor.

BRIEF DESCRIPTION OF DRAWINGS

In the following, example embodiments will be described in greater detail with reference to the attached drawings, in which FIG. 2 illustrates an exemplary process according to embodiments.

DETAILED DESCRIPTION

Figures 1A, 1B:
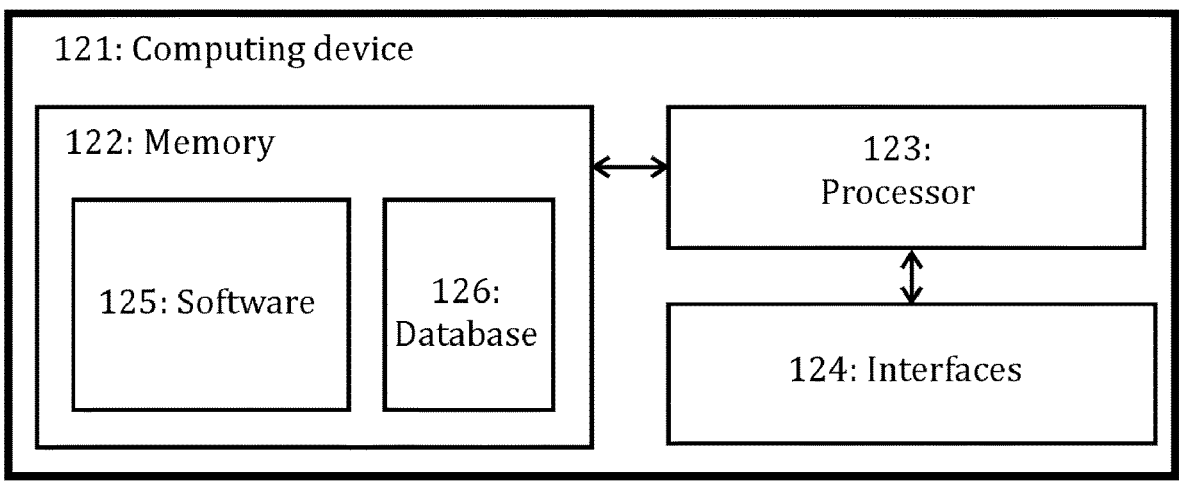
FIG. 1A illustrates an exemplary industrial system according to an embodiment.
FIG. 1B illustrates a computing device for a drive of the exemplary industrial system of FIG. 1A according to an embodiment.

The following embodiments are only presented as examples. Although the specification may refer to "an", "one", or "some" embodiment(s) and/or example(s) in several locations of the text, this does not necessarily mean that each reference is made to the same embodiment(s) or example(s), or that a particular feature only applies to a single embodiment and/or example. Single features of different embodiments and/or examples may also be combined to provide other embodiments and/or examples.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware.

In at least some of the following embodiments, a per-unit (pu or p.u.) system may be employed for mathematical description of an externally excited synchronous machine. The per-unit system is the dimensionless relative value system defined in terms of base values. A pu quantity $x_{pu}$ may be defined as an absolute physical value $x_{act}$ in SI-units divided by its base value $x_B$, that is, the equation $x_{pu}=X_{act}/X_b$ may apply. The motor nominal values may be chosen to be the base values in the pu system.

A synchronous motor (or equally a synchronous machine) is an electric motor where the rotation of the motor shaft (i.e., of the rotor) is synchronized with the frequency of the supply current at steady state so that the rotation period is equal to an integral number of alternating current (AC) cycles.

Externally excited (or externally magnetized) synchronous machines (or motors) are used in a variety of applications in industry, transportation and utilities sectors. In externally excited synchronous machines, the rotor of the synchronous machine is connected to a direct current (DC) power source via a rotating electrical contact called a slip ring and conductive brushes for exciting the rotor (via an excitation current). Alternatively, a brushless exciter may be employed for enabling said DC connection.

In externally excited synchronous machines (or motors), a reduction factor (equally called a rotor-to-stator reduction factor or a reduction factor of the excitation current) is used to refer the rotor excitation current to the stator side. In other words, the reduction factor may be used for referring a (measured) excitation current (and rotor resistances) to the stator voltage level. Also, the reduction factor may be also used for referring an excitation current reference calculated at the stator voltage level to the excitation winding voltage level for excitation unit current control. Accurate estimation of the reduction factor is important as an erroneous reduction factor affects the current model flux estimation, which directly affects the excitation control and torque.

The rotor-to-stator reduction factor $k_r$ may be defined using the equation.

$$k_r = \frac{i_f}{i_F} \tag{1}$$

where $i_f$ and $i_F$ are, respectively, a rotor excitation current (magnitude) referred to the stator and a rotor excitation current (magnitude). The rotor excitation current $i_F$ may be equally called rotor excitation DC current. Unless otherwise explicitly indicated, the term "rotor excitation current" is used in the following to mean the rotor excitation DC current $i_F$. As can be discerned based on (1), the rotor-to-stator reduction factor is usable by a drive for referring the rotor parameters (e.g., the rotor excitation current and/or resistance) to the stator side (i.e., for calculating stator parameters knowing the associated rotor parameters). The reduction factor may be defined in the same manner for both salient pole and non-salient pole synchronous motors (equally called salient and non-salient synchronous motors or machines).

Conventionally, the reduction factor is either provided in a design document of the synchronous motor or, if no design document is available, calculated based on short-circuit measurements (i.e., from a short-circuit curve) and zero-load measurements. Said calculation typically requires specific data provided by the manufacturer of the synchronous machine. However, this data may not be always available and/or it may be inaccurate leading an error in the calculated reduction factor.

The embodiments to be discussed below in detail seek to overcome the aforementioned problems by enabling calculation of the reduction factor based on a set of measurements.

FIG. 1A illustrates a system to which embodiments of the invention may be applied. FIG. 1A illustrates simplified system architecture only showing some elements and functional entities (namely, showing only some excitation control related elements and functional entities), all being logical units whose implementation may differ from what is shown. The connections shown in FIG. 1A are logical connections; the actual physical connections may be different. It is apparent to a person skilled in the art that the system may also comprise other functions and structures.

FIG. 1A illustrates a system comprising a drive 101 (equally called a motor drive) controlling a synchronous motor 111. The drive 101 is powered by a power supply 114. The synchronous motor 111 may be specifically an externally excited synchronous motor 111 with the external excitation being provided by the exciter 112 (e.g., a slip ring with conductive brushes or a brushless exciter) which is controlled or driven by the drive 101 (or specifically by the excitation unit 104 therein). The illustrated system (or specifically the drive 101) may be configured to operate using direct torque control (DTC), current vector control or any other control scheme for motor drives. The synchronous motor 111 may be salient pole or non-salient pole.

The synchronous motor 111 (or equally the synchronous machine 111) is connected to a mechanical load 113. The mechanical load 113 may correspond, for example, to a device or a system for transporting material, such as a pump, a fan, a compressor, a blower, a conveyor belt, a crane and/or an elevator and/or a device or a system for processing materials, such as a paper machine, a mill, a stirrer and/or a centrifuge.

The drive 101 is a device used for controlling the motion of the synchronous motor 111 (or a synchronous machine). Said control may be achieved by changing one or more drive parameters of the drive 101 which may comprise parameters such as torque, speed, power, voltage, rotor excitation current, stator flux linkage, frequency, motor control mode (e.g., scalar, vector or direct torque control), proportional-integral-derivative (PID) controller settings, acceleration ramp settings, deceleration ramp settings and/or other parameters affecting the operation of the drive. The drive 101 may specifically be an electrical drive (an AC drive supporting low to high voltages and/or low to high motor speeds). The drive 101 may be equally called a frequency converter. The drive 101 may be a programmable logic controller (PLC) or a (motor) soft starter. In an embodiment, the drive 101 may be a variable speed drive (VSD) or a variable frequency drive (VFD). The drive 101 (or specifically the inverter unit 103) feeds the synchronous motor 111 via a three-phase power supply. Contrary to some definitions of term "drive", the synchronous motor 111 which is driven by the drive 101 does not form a part of the drive 101 itself in the context of this application (as is also shown in FIG. 1A).

The drive 101 comprises a rectifier unit 102 for connecting to the alternating current (AC) power supply 114 and converting the AC power to DC power.

Moreover, the drive 101 comprises an inverter unit 103 for converting the DC power provided by the rectifier unit 102 to AC power for driving the synchronous motor 111 in a controlled manner. Specifically, the inverter unit 103 is configured to feed the stator winding of the synchronous motor 111 to control the operation of the synchronous motor 111 (e.g., the air gap torque and the stator flux linkage). In other words, the inverter unit 103 is configured to provide stator voltage signals having a particular voltage and frequency to the synchronous motor 111. As described above, the control of the synchronous motor 111 may be provided using, e.g., DTC or current vector control or scalar control.

The rectifier and inverter units 102, 103 may be connected together via a direct current (DC) circuit (equally called a DC link) which may comprise, for example, at least one DC choke and/or one or more capacitors (not shown in FIG. 1A).

The rectifier and inverter units 102, 103 effectively form together a DC link converter (unit) for performing a two-phase frequency conversion from the AC power of the AC power supply 114 to DC power and from said DC power to AC power suitable for driving the synchronous motor 111 in a controlled manner. In other embodiments, a single-phase frequency conversion may be employed in the drive 101, instead of the two-phase frequency conversion. In such embodiments, a (single) direct converter unit may be provided instead of the rectifier and inverter units 102, 103 (and the DC link between them).

The embodiments for calculating a reduction factor to be discussed below in detail may be implemented specifically in a converter of the drive 101 such as in the rectifier unit 102 and/or in the inverter unit 103.

Additionally, the drive 101 comprises an excitation unit for providing an external DC excitation for a rotor of the synchronous machine 111 (i.e., for an excitation winding of the synchronous machine 111). The external excitation may be provided to the excitation winding via an exciter 112 such as a rotary electrical contact (also called a split ring or an electrical slip ring). The excitation unit 104 may be configured to be controlled by the inverter unit 103. For example, the inverter unit 103 may be configured to calculate an excitation winding current that would produce unity power factor (or other desired power factor) in the steady state and to provide the calculated value as an excitation (or field) current reference to the excitation unit 104.

The drive 101 may further comprise one or more user input devices (e.g., a control panel or a touch screen) for enabling the user to control the operation of the drive 101.

The drive 101 may be configured to monitor one or more drive parameters of the drive 101 and/or one or more motor parameters of the synchronous motor 111. The drive 101 may monitor, for example, values of the stator flux linkage reference (or stator flux reference), the rotor excitation current reference, the torque reference and/or the stator flux linkage load angle reference. In some embodiments, at least the stator flux linkage and optionally the rotor excitation current reference and/or the stator current may be monitored.

The drive 101 may be configured to control the externally-excited synchronous motor 111 using any conventional control scheme. For example, one common way which may be employed by the drive 101 for controlling the externally-excited synchronous motor 111 is the so-called vector control where the torque of the motor 111 is controlled by controlling a stator current and/or voltage vector. The stator current/voltage vector is a vector comprising two orthogonal stator current/voltage components derived from stator currents/voltages of a three-phase AC electric machine. One of said components defines the magnetic flux of the motor, the other the torque of the motor. These stator current/voltage components may be written either in a stationary reference frame as α- and β-axis stator currents/voltages or in a rotation reference frame (moving in sync with the rotor) as d- and q-axis stator currents/voltages, respectively. The actual control in the vector control is typically performed for the d- and q-axis stator currents or voltages. The d- and q-axis currents/voltages may be converted to the α- and β-axis currents/voltages using inverse Park transform while an opposite transformation is possible using Park transform.

One example of a specific type of vector control which may be employed by the drive 101 is the so-called Direct Torque Control (DTC). DTC corresponds to an advanced form of direct flux linkage control (DFLC) where the stator flux linkage of the synchronous motor is directly controlled with the stator voltage vector, as in conventional DFLC, while also employing a current model which keeps the stator flux linkage estimate accurate also at low frequencies (i.e., employing current feedback correction). The current model may be specifically based on measured stator currents and motor inductance parameters. The torque of the synchronous motor can be changed by accelerating rotational speed of the stator flux linkage vector.

While FIG. 1A illustrates a single synchronous motor 111, in other embodiments the drive 101 may be used for controlling an electrical machine comprising multiple synchronous motors or machines.

FIG. 1B illustrates a computing device 121 which may form a part of a drive such as the drive 101 of FIG. 1A or be at least communicatively connected to said drive. Specifically, the computing device 121 may form a part of a converter (or a converter unit) of the drive 101 or may be at least communicatively connected to it. Said converter may be, e.g., a rectifier 102 or an inverter 103 of a DC link converter of the drive 101 or a direct converter of a drive. The computing device may be configured to at least cause operations necessary for calculating the rotor-to-stator reduction factor as will be described below in detail.

The computing device 121 comprises a processor 123, interfaces 124 and a memory 122. The processor 123 may be a central processing unit (CPU) of the drive 101. In some embodiments, one or more control circuitry such as one or more processors may be provided in the computing device 121, instead of a singular processor 123. According to embodiments, the computing device 121 may comprise one or more control circuitry 123, such as at least one processor, and at least one memory 122, including one or more algorithms 125, such as a computer program code (software), wherein the at least one memory 122 and the computer program code (software) are configured, with the at least one processor, to cause the computing device 121 to carry out any one of the exemplified functionalities of the computing device or the drive to be described below. It is also feasible to use specific integrated circuits, such as ASIC (Application Specific Integrated Circuit) or other components and devices for implementing the functionalities in accordance with different embodiments.

The memory 122 of the computing device 121 may be implemented using any suitable data storage technology, such as semiconductor based memory devices, flash memory, magnetic memory devices and systems, optical memory devices and systems, fixed memory and removable memory. The memory 122 comprises at least one database 126 and software 125 (i.e., one or more algorithms).

The interfaces 124 of the computing device 121 may comprise, for example, one or more communication interfaces comprising hardware and/or software for realizing communication connectivity according to one or more communication protocols. Specifically, the one or more communication interfaces 124 may comprise, for example, at least one interface providing a connection to an excitation unit. The one or more communication interfaces 104 may comprise standard well-known components such as an amplifier, filter, frequency-converter, (de)modulator, and encoder/decoder circuitries, controlled by the corresponding controlling units, and one or more antennas. The one or more communication interfaces 124 may also comprise a user interface.

In the following, an equation for calculating the rotor-to-stator reduction factor of the synchronous motor (without requiring any specific manufacturer data except possibly for the stator leakage inductance $L_{s\sigma}$) is derived for providing mathematical basis for the processes according to embodiments to be discussed thereafter.

The d-axis (i.e., direct axis) and q-axis (i.e., quadrature axis) stator flux (linkage) equations of a synchronous motor (in the rotating rotor reference frame) may be written as $$\psi_{sd} = L_{s\sigma}i_{sd} + L_{md}(i_f + i_{sd} + i_D) \tag{2}$$

$$\psi_{sq} = L_{s\sigma}i_{sq} + L_{mq}(i_{sq} + i_Q) \tag{3}$$

where $\psi_{sd}$ is a d-axis stator flux linkage, $\psi_{sq}$ is a q-axis stator flux, $L_{s\sigma}$ is a stator leakage inductance, $i_{sd}$ is a d-axis stator current, $i_{sq}$ is a q-axis stator current, $L_{md}$ is the d-axis magnetizing inductance, $L_{mq}$ is the q-axis magnetizing inductance, $i_D$ is a d-axis damper winding current, $i_Q$ is a q-axis damper winding current and $i_f$ is the rotor excitation current referred to stator.

In zero-load conditions (i.e., conditions where zero power, meaning active and reactive power, is supplied from the stator side) assuming steady state operation, the following applies $i_{sd}=i_{sq}=i_D=i_Q=0$ p.u. and thus equations (2) and (3) may be simplified, respectively, to $$\psi_{sd,0} = L_{md}i_f, \tag{4}$$

$$\psi_{sq,0} = 0. \tag{5}$$

The stator flux linkage amplitude is defined as $$\psi_s = \sqrt{\psi_{sd}^2 + \psi_{sq}^2}. \tag{6}$$

By inserting (4) and (5) into (6), the stator flux linkage amplitude at zero-load conditions and at steady state $\psi_{s,0}$ may be written simply as $$\psi_{s,0} = L_{md} i_f. \tag{7}$$

Finally, based on (7) and the definition of the reduction factor given in (1), the following equation for the d-axis magnetizing inductance $L_{md}$ may be derived:

$$L_{md} = \frac{\psi_{s,0}}{k_r i_{F,0}}, \tag{8}$$

where $i_{F,0}$ is the rotor excitation (DC) current magnitude under zero-load conditions. It should be noted that when there is no load, the d-axis stator flux linkage $\psi_{sd}$ is, in general, simply equal to the (total) stator flux linkage (here denoted as $\psi_{s,0}$).

Inserting (8) back into (2), we get the equation $$\psi_{sd} = L_{s\sigma} i_{sd} + \frac{\psi_{s,0}}{k_r i_{F,0}}(i_{sd} + k_r i_F). \tag{9}$$

Based on (9), the rotor-to-stator reduction factor $k_r$ can be obtained as $$k_r = \frac{\frac{\psi_{s,0}}{i_{F,0}} \frac{i_{sd}}{i_F}}{\frac{\psi_{sd}}{i_F} - L_{s\sigma} \frac{i_{sd}}{i_F} - \frac{\psi_{s,0}}{i_{F,0}}}. \tag{10}$$

During zero-load operation (with the q-axis $i_{sq}=0$ & $\psi_{sq}=0$), the d-axis stator flux linkage $\psi_{sd}$ is simply equal to the (total) stator flux linkage $\psi_s$, i.e., we have $$\psi_{sd} = \psi_s. \tag{11}$$

When the rotor excitation current $i_F$ is increased relative to the zero-load value of the rotor excitation current $i_{F,0}$, the current will again flow to the stator winding (i.e., the magnitude of the stator current $i_s$ will increase and become nonzero). Specifically, the d-axis stator current will become $$i_{sd} = -i_s. \tag{12}$$

By inserting (11) and (12) into (10), the rotor-to-stator reduction factor $k_r$ can be written as $$k_r = \frac{\frac{\psi_{s,0}}{i_{F,0}} \frac{i_s}{i_F}}{\frac{\psi_{s,0}}{i_{F,0}} - L_{s\sigma} \frac{i_s}{i_F} - \frac{\psi_s}{i_F}}. \tag{13}$$

In some alternative embodiments, the rotor excitation current $i_F$ may be decreased relative to the zero-load value of the rotor excitation current $i_{F,0}$ and, therefore, the equation $i_{sd}=+i_s$ may hold instead of (12). Consequently, the rotor-to-stator reduction factor $k_r$ may be written as:

$$k_r = \frac{\frac{\psi_{s,0}}{i_{F,0}} \frac{i_s}{i_F}}{\frac{\psi_s}{i_F} - L_{s\sigma} \frac{i_s}{i_F} - \frac{\psi_{s,0}}{i_{F,0}}}. \tag{14}$$

Either of the equations (13)-(14) may be employed by the drive for calculating the rotor-to-stator reduction factor. However, in order to do this, the drive needs to first somehow obtain values of $\psi_{s,0}$, $\psi_s$, $i_{F,0}$, $i_s$ and $i_F$. How these values may be obtained is discussed in the following.

FIG. 2 illustrates a process according to embodiments for calculating the rotor-to-stator reduction factor of an externally excited synchronous motor. The process may be carried out by a drive or specifically by a converter of a drive (or another apparatus comprised in the drive). For example, the process may be carried out by the drive 101 of FIG. 1A (e.g., by the rectifier and/or inverter unit 102, 103 therein) or specifically by the computing device 121 of FIG. 1B comprised in the drive 101 (in the rectifier or inverter unit 102, 103 or communicatively connected thereto). Specifically, at least one processor of the computing device of the drive and at least one memory of the computing device of the drive for storing instructions to be executed by the at least one processor may be configured so as to cause the drive to carry out the illustrated process. In the following discussion, the actor of the process is called "the apparatus" for simplicity.

Referring to FIG. 2, the apparatus initially sets, in block 201, a value at least for a stator flux linkage reference ($\psi_{s,ref}$) of the externally excited synchronous motor. The value for the stator flux linkage reference may be selected to be relatively small. Namely, the value of the stator flux linkage reference may be selected to be small enough to enable operation in a (substantially) linear region of a d-axis magnetizing inductance ($L_{md}$) of the externally excited synchronous motor without saturation. Said linear region may be defined as a region where the magnetizing flux (linkage) ($\psi_{md}$) and the magnetizing current ($i_{md}$) have a linear relationship, that is, the magnetizing flux (linkage) changes in a linear manner with the changing magnetizing current. In other words, the equation $O_{md}=L_{md} i_{md}$ is assumed to apply with a constant value of $L_{md}$ (where $i_{md}=i_F+i_{sd}$ assuming steady state operation).

In some embodiments, the value of the stator flux linkage reference may be selected to be within a range of 0.3-0.7 p.u. or within a range of 0.4-0.6 p.u., where "p.u." refers to a per-unit system defined so that 1 p.u. corresponds (substantially) to a nominal stator flux linkage. For example, the value of the stator flux linkage reference may be selected to be 0.5 p.u.

In some embodiments, the apparatus may further set, in block 201, an (initial) value for a rotor excitation current reference of the externally excited synchronous motor. In general, the initial value for the rotor excitation current reference may be such that the acceleration of the externally excited synchronous motor to the set speed is enabled. The initial value for the rotor excitation current reference may be selected to be at least below a nominal rotor excitation current of the externally excited synchronous motor.

In some embodiments, the initial value for the rotor excitation current reference may be read from a pre-defined zero-load curve (equally called a zero-load voltage curve) mapping zero-load voltage against zero-load excitation current.

In some embodiments, the initial value of the rotor excitation current reference may be selected to be smaller than the nominal rotor excitation current (and larger than zero). More specifically, the initial value of the rotor excitation current reference may be selected to be within a range of 10%-70% of the nominal rotor excitation current or within a range of 20%-70% of the nominal rotor excitation current or within a range of 30%-70% of the nominal rotor excitation current or within a range of 20%-60% of the nominal rotor excitation current or within a range of 30%-60% of the nominal rotor excitation current or within a range of 20%-50% of the nominal rotor excitation current or within a range of 30%-50% of the nominal rotor excitation current. For example, the initial value of the rotor excitation current reference may be selected to be 50% of the nominal rotor excitation current.

The apparatus causes, in block 202, the drive to drive the externally excited synchronous motor with a speed (or specifically an angular or rotating speed) within a linear modulation range using said value for the stator flux linkage reference (and said for value for the rotor excitation current reference) set in block 201. The speed may be high enough so that stator resistance effect can be neglected.

In some embodiments, the upper limit for the linear modulation range (for a three-phase two-level inverter) may be defined according to the equation:

$$\omega_{s,max} = \frac{u_{DC}}{\sqrt{3}\,\psi_{s,ref}},\qquad(15)$$

where $\omega_{s,max}$ is a maximum angular speed (or equally maximum stator angular frequency) for the linear modulation range, $u_{DC}$ is a DC link voltage of the drive and $\psi_{s,ref}$ is the stator flux linkage reference having the value set in block 201. Thus, the (angular) speed at which the externally excited synchronous motor is driven may be equal to or smaller than the upper limit defined by (15). For example, the (angular speed) may be within the range 0.5-0.7 p.u.

During said driving of the externally excited synchronous motor in block 202, the apparatus adjusts, in block 203, the rotor excitation current reference to determine a minimum-load value for the rotor excitation current, that is, a value corresponding to a minimum stator current and thus to a minimum or minimized load. The minimum stator current may correspond here substantially to a zero current implying zero load. Said minimum-load value may be stored to at least one memory of the apparatus (or connected to the apparatus).

It should be noted that, in this minimum-load operating point, a minimum-load value for the stator flux linkage (being associated with the minimum-load value for the rotor excitation current) is equal to the stator flux linkage reference set in block 201, i.e., $\psi_{s,0}=\psi_{s,ref}$ applies.

Further during said driving of the externally excited synchronous motor in block 202, the apparatus causes, in block 204, increasing or decreasing of the rotor excitation current (starting from said minimum-load value) until a stator current is within a pre-defined (operating) range. In general, the stator current should be high enough so that the q-axis component can be neglected. A higher stator current means also that the leakage flux $L_{s\sigma}i_{sd}$ is higher. On the other hand, the value of the stator current is selected to be too high, the sensitivity to errors in $L_{s\sigma}$ increases. The pre-defined range may at least have a lower limit higher than zero (amperes) and/or an upper limit lower than the nominal stator current of the externally excited synchronous motor. For example, the pre-defined range for the stator current may be defined as $0.3/_N$-$0.5/_N$, where $/_N$ is the nominal stator current of the externally excited synchronous motor.

The apparatus determines (or measures or causes measuring), in block 205, when the stator current is within the pre-defined range, operating values for the stator current and the rotor excitation current. Said operating values may be stored to at least one memory of the apparatus (or connected to the apparatus).

Moreover, it should be noted that, in this operating point, an operating value for the stator flux linkage (being associated with the operating values for the stator current and the rotor excitation current) is also equal to the stator flux linkage reference set in block 201, i.e., $\psi_s=\psi_{s,ref}$ applies.

The apparatus calculates, in block 206, a rotor-to-stator reduction factor of the externally excited synchronous motor based at least on the minimum-load and operating values of the rotor excitation current, the operating value of the stator current and the value of the stator flux linkage reference. The calculation in block 206 may be further based on a pre-defined stator leakage inductance of the externally excited synchronous motor. Said pre-defined stator leakage inductance may be stored in at least one memory of the apparatus. It should be noted that the process of FIG. 2 is relatively robust to errors in the leakage inductance value and thus the value of the pre-defined stator leakage inductance may correspond merely to an approximation of the actual stator leakage inductance.

In some embodiments, the calculation of the rotor-to-stator reduction factor in block 206 may be carried out based on the equation (13). Specifically, the rotor-to-stator reduction factor $k_r$ may be calculated according to $$k_r = \frac{\dfrac{\psi_{s,ref}}{i_{F,0}}\dfrac{i_s}{i_F}}{\dfrac{\psi_{s,ref}}{i_{F,0}} - L_{s\sigma}\dfrac{i_s}{i_F} - \dfrac{\psi_{s,ref}}{i_F}},\qquad(16)$$

wherein $\psi_{s,ref}$ is the value set for the stator flux linkage reference (in block 201), $i_{F,0}$ is the minimum-load value of the rotor excitation current (acquired in block 203), $i_F$ is the operating value of the rotor excitation current (acquired in block 205), $i_s$ is the operating value of the stator current (acquired in block 205) and $L_{s\sigma}$ is the pre-defined stator leakage inductance (maintained the at least one memory). Equation (16) may apply specifically when the rotor excitation current is increased (starting from said minimum-load value) until the stator current is within the pre-defined (operating) range in block 204.

In alternative embodiments where the rotor excitation current is decreased (starting from said minimum-load value) until the stator current is within the pre-defined (operating) range in block 204, the calculation of the rotor-to-stator reduction factor $k_r$ in block 206 may be carried out, based on (14), according to $$k_r = \frac{\dfrac{\psi_{s,ref}}{i_{F,0}}\dfrac{i_s}{i_F}}{\dfrac{\psi_{s,ref}}{i_F} - L_{s\sigma}\dfrac{i_s}{i_F} - \dfrac{\psi_{s,ref}}{i_{F,0}}},\qquad(17)$$

Following the calculation of the rotor-to-stator reduction factor in block 206, the apparatus (and/or the drive) may be configured to use the rotor-to-stator reduction factor for referring the rotor excitation current and/or associated resistance to stator side quantities during operation of the drive (e.g., as a part of a control method implemented by the drive). Subsequently, the stator side quantities may be used, by the apparatus (and/or the drive), for controlling the externally excited synchronous motor. For example, the rotor-to-stator reduction factor may be a parameter of an equivalent circuit (or a machine model) of an externally excited synchronous motor used, by the apparatus (and/or the drive), in controlling the externally excited synchronous motor.

In some embodiments, the apparatus may, following the calculation of the rotor-to-stator reduction factor in block 206, cause transmission of the calculated rotor-to-stator reduction factor to another device via at least one wireless and/or wired communication network and/or wired and/or wireless communication link. Said another device may be or comprise a computing device. Said another device may be, e.g., a mobile phone, a tablet computer, a desktop computer, a laptop computer or a server computer.

In some embodiments, the apparatus may, following the calculation of the rotor-to-stator reduction factor in block 206 cause displaying the calculated value of the rotor-to-stator reduction factor to a user via a display (of the drive).

The blocks, related functions, and information exchanges described above by means of FIG. 2 are in no absolute chronological order, and some of them may be performed simultaneously or in an order differing from the given one. Other functions can also be executed between them or within them, and other information may be sent and/or received, and/or other mapping rules applied. Some of the blocks or part of the blocks or one or more pieces of information can also be left out or replaced by a corresponding block or part of the block or one or more pieces of information.

In an embodiment, at least some of the processes described in connection with FIG. 2 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form (processing) means or comprises one or more computer program code portions for carrying out one or more operations according to any one of the embodiments of FIG. 2 or operations thereof.

Embodiments as described may also be carried out in the form of a computer process defined by a computer program or portions thereof. Embodiments of the methods described in connection with FIG. 2 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the embodiments have been described above with reference to examples according to the accompanying drawings, it is clear that the embodiments are not restricted thereto but can be modified in several ways within the scope of the appended claims. Therefore, all words and expressions should be interpreted broadly, and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus for a drive for driving an externally excited synchronous machine that has a rotor and a stator, the apparatus comprising at least one processor and at least one non-transitory memory storing computer program code, which, when executed with the at least one processor, cause the apparatus to:

set a value for a stator flux linkage reference of the externally excited synchronous machine, wherein the value of the stator flux linkage reference is selected to be small enough to enable operation in a linear region of a d-axis magnetizing inductance of the externally excited synchronous machine without saturation;

cause the drive to drive the externally excited synchronous machine with a speed within a linear modulation range using said value for the stator flux linkage reference;

adjust, during the driving, a rotor excitation current reference to determine a minimum-load value of a rotor excitation current corresponding to a minimum stator current and thus to a minimum load;

cause, during the driving, increasing or decreasing of the rotor excitation current until a stator current is within a pre-defined range;

determine, when the stator current is within the pre-defined range, operating values for the stator current and the rotor excitation current; and calculate a rotor-to-stator reduction factor of the externally excited synchronous machine based at least on the minimum-load and operating values of the rotor excitation current, the operating value of the stator current and the value for the stator flux linkage reference.

2. The apparatus of claim 1, wherein the computer program code, when executed with the at least one processor, further cause the apparatus to: before the driving of the externally excited synchronous machine, set an initial value for a rotor excitation current reference of the externally excited synchronous machine, wherein the initial value for the rotor excitation current reference is selected to be at least below a nominal rotor excitation current of the externally excited synchronous machine; and use the initial value for the rotor excitation current reference during the driving.

3. The apparatus of claim 2, wherein the initial value of the rotor excitation current reference is selected to be within a range of 30%-70% of the nominal rotor excitation current.

4. The apparatus of claim 1, wherein the value of the stator flux linkage reference is selected to be within a range of 0.3-0.7 p.u., a per-unit system being defined so that 1 p.u. corresponds substantially to a nominal stator flux linkage.

5. The apparatus of claim 1, wherein an upper limit for the linear modulation range is defined according to the equation:

$$\omega_{s,max} = \frac{u_{DC}}{\sqrt{3}\,\psi_{s,ref}},$$

where $\omega_{s,max}$ is a maximum angular speed for the linear modulation range, $u_{DC}$ is a direct current, DC, link voltage of the drive and $\psi_{s,ref}$ is the stator flux linkage reference having said value.

6. The apparatus of claim 1, wherein the pre-defined range for the stator current is $0.3/_N$-$0.5/_N$, $/_N$ being a nominal stator current of the externally excited synchronous machine.

7. The apparatus of claim 1, wherein the apparatus is configured to calculate the rotor-to-stator reduction factor further based on a pre-defined stator leakage inductance of the externally excited synchronous machine.

8. The apparatus according to claim 7, wherein the apparatus is configured to calculate the rotor-to-stator reduction factor $k_r$ according to $$k_r = \frac{\dfrac{\psi_{s,ref}}{i_{F,0}}\dfrac{i_s}{i_F}}{\dfrac{\psi_{s,ref}}{i_{F,0}} - L_{s\sigma}\dfrac{i_s}{i_F} - \dfrac{\psi_{s,ref}}{i_F}} \quad \text{or}$$

$$k_r = \frac{\dfrac{\psi_{s,ref}}{i_{F,0}}\dfrac{i_s}{i_F}}{\dfrac{\psi_{s,ref}}{i_F} - L_{s\sigma}\dfrac{i_s}{i_F} - \dfrac{\psi_{s,ref}}{i_{F,0}}},$$

wherein $\psi_{s,ref}$ is the value set for the stator flux linkage reference, $i_{F,0}$ is the minimum-load value of the rotor excitation current corresponding to the minimum stator current and the minimum load, $i_F$ is the operating value of the rotor excitation current, $i_s$ is the operating value of the stator current and $L_{s\sigma}$ is the pre-defined stator leakage inductance.

9. The apparatus of claim 1, wherein the apparatus is configured to store the minimum-load and operating values determined for the rotor excitation current and the operating value determined for the stator current to at least one memory.

10. The apparatus of claim 1, wherein the minimum stator current corresponds substantially to a zero current and the minimum load corresponds substantially to a zero load.

11. The apparatus of claim 1, wherein the apparatus is configured to use the rotor-to-stator reduction factor for referring the rotor excitation current and/or associated resistance to stator side quantities during operation of the drive.

12. The apparatus of claim 1, wherein the apparatus is a converter for the drive for driving the externally-excited synchronous machine, the externally-excited synchronous machine being a converter-driven externally-excited synchronous machine.

13. An electrical drive for driving an externally excited synchronous machine that has a rotor and a stator, the drive being configured to:

set a value for a stator flux linkage reference of the externally excited synchronous machine, wherein the value for the stator flux linkage reference is selected to be small enough to enable operation in a linear region of a d-axis magnetizing inductance of the externally excited synchronous machine without saturation;

drive the externally excited synchronous machine with a speed within a linear modulation range using said value for the stator flux linkage reference;

adjust, during the driving, a rotor excitation current reference to determine a minimum-load value of a rotor excitation current corresponding to a minimum stator current and thus to a minimum load;

cause, during the driving, increasing or decreasing of the rotor excitation current until a stator current is within a pre-defined range;

determine, when the stator current is within the pre-defined range, an operating value for the stator current and an operating value for the rotor excitation current; and calculate a rotor-to-stator reduction factor of the externally excited synchronous machine based at least on the minimum-load value of the rotor excitation current, the operating value for the rotor excitation current, the operating value for the stator current and the value for the stator flux linkage reference.

14. A method comprising:

setting a value for a stator flux linkage reference of an externally excited synchronous machine that has a rotor and a stator, wherein the value of the stator flux linkage reference is selected to be small enough to enable operation in a linear region of a d-axis magnetizing inductance of the externally excited synchronous machine without saturation;

causing a drive to drive the externally excited synchronous machine with a speed within a linear modulation range using said value for the stator flux linkage reference;

adjusting, during the driving, a rotor excitation current reference to determine a minimum-load value of a rotor excitation current corresponding to a minimum stator current and thus to a minimum load;

causing, during the driving, increasing or decreasing of the rotor excitation current until a stator current is within a pre-defined range;

determining, when the stator current is within the pre-defined range, operating values for the stator current and the rotor excitation current; and calculating a rotor-to-stator reduction factor of the externally excited synchronous machine based at least on the minimum-load and operating values of the rotor excitation current and the operating value of the stator current.

15. A computer program product comprising program instructions stored in a non-transitory computer readable medium, the program instructions being configured to cause an apparatus, when executing the program instructions by at least one processor, to perform at least the following:

setting a value for a stator flux linkage reference of an externally excited synchronous machine that has a rotor and a stator, wherein the value of the stator flux linkage reference is selected to be small enough to enable operation in a linear region of a d-axis magnetizing inductance of the externally excited synchronous machine without saturation;

causing a drive to drive the externally excited synchronous machine with a speed within a linear modulation range using said value for the stator flux linkage reference;

adjusting, during the driving, a rotor excitation current reference to determine a minimum-load value of a rotor excitation current corresponding to a minimum stator current and thus to a minimum load;

causing, during the driving, increasing or decreasing of the rotor excitation current until a stator current is within a pre-defined range;

determining, when the stator current is within the pre-defined range, operating values for the stator current and the rotor excitation current; and calculating a rotor-to-stator reduction factor of the externally excited synchronous machine based at least on the minimum-load and operating values of the rotor excitation current and the operating value of the stator current.

\* \* \* \* \*